Oct. 16, 1962 D. D. JOHNSON ETAL 3,058,844

COMPOSITION OF EPOXIDE RESIN, METHYLOL PHENOL ETHER, POLYVINYL METHYL ETHER, AND ACID ANHYDRIDE CATALYST, AND METAL SUBSTRATE COATED THEREWITH, ESPECIALLY A MAGNETIC SIGNAL STORAGE DEVICE

Filed Oct. 13, 1959

Donald D. Johnson
Ralph Flores
Marcel J. Vogel
INVENTORS

BY

Merriam, Smith & Marshall
Attorneys

United States Patent Office 3,058,844
Patented Oct. 16, 1962

3,058,844

COMPOSITION OF EPOXIDE RESIN, METHYLOL PHENOL ETHER, POLYVINYL METHYL ETHER, AND ACID ANHYDRIDE CATALYST, AND METAL SUBSTRATE COATED THEREWITH, ESPECIALLY A MAGNETIC SIGNAL STORAGE DEVICE

Donald D. Johnson, Los Gatos, and Ralph Flores and Marcel J. Vogel, San Jose, Calif., assignors to International Business Machines Corporation, New York, N.Y., a corporation of New York Filed Oct. 13, 1959, Ser. No. 846,154
15 Claims. (Cl. 117—132)

Figure 1:
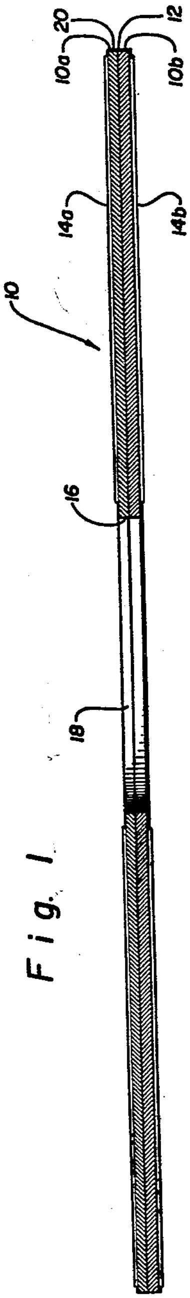

The present invention relates to coating and coating compositions. The present application is a continuation-in-part of our copending application Serial No. 680,085, filed August 26, 1957, and now abandoned.

The problem which confronted the applicants was primarily that of providing a coating having magnetic characteristics (i.e., containing magnetic iron oxide) which would withstand heavy abrasion (as, for example, when subjected to continuous abrasion at high speed); which was adherent to metal under conditions of abrasion, shock, temperature change and heavy working; which was not and would not become brittle; which could be readily applied in a uniform layer; and which would stand up under high humidities.

No coating composition or system of coatings on the market satisfied these conditions, or in fact came close to meeting them. For example, the primary application intended was on the recording disks employed in a computer such as the "Ramac" machine where surface speeds in the thousands of feet per minute are encountered during which the coating may be in contact with the magnetic pickup device.

A research project investigating all known film formers was set up, with particular emphasis on coating which could be applied by centrifugal means. Upon failure of the single film forming ingredients, two component systems were then investigated, and it was determined that two component systems including the epoxy resins of above 400, and preferably above 800 epoxide equivalent, gave the best promise of stability to humidity as well as chemical and mechanical resistance. These systems, however, had practically no adherence. Of the epoxy resins, those marketed by the Shell Oil Company under the name "Epon" were most commonly employed, and these were investigated in the range from Epon 562 to Epon 1009. Those Epons close to 1004 were found to be most satisfactory.

In a magnetic disk the selection of Epons is narrower than when using a coating merely for protective purposes. For example, Epon 1007 (epoxide equivalent over 1650) while producing a hard, tough, adherent and resistant coating, tends to produce one which has a poor signal-to-noise ratio when used in a magnetic disk.

Epoxys below 1001 have a tendency to cause embrittlement.

The epoxy resins, of course, require a catalyst for their setting, and it was discovered that the character of the catalyst was of great importance in determining the characteristics of the resultant coating of the film.

It was discovered that amine catalysts were not satisfactory under normal conditions for the curing of the epoxy resins. It was ultimately discovered that hexa hydro phthalic anhydride, which was not previously known as a catalyst for these resins, was superior to all others tried. Pyro mellitic di anhydride was not as good but was useable. The catalyst has to be stable at room temperature in the presence of the resin; show no change in viscosity until curing; be compatible with the system; and be safe for coating use (some of the amines are severely active on the skin).

Dodecenyl succinic anhydride, methyl nadic anhydride, hexa hydro phthalic anhydride, Armeen DMC and tetra hydro phthalic anhydride are catalysts which have been successfully employed, but preferred catalyst is hexa hydro phthalic anhydride.

In carrying on combinations of epoxy resins with other resins, such as the phenolics, it was found that hardness and toughness could be obtained in many cases but then the coating was not smooth or did not have humidity resistance. Likewise, hardness and toughness might be accomplished without chemical or abrasion resistance or adhesion might be completely lacking.

Smoothness was one of the characteristics which was most difficult to obtain. It was eventually found that the compound known as PVM (poly vinyl methyl ether) controlled the flow of the film before hardening so as to give great smoothness. A PVM having a viscosity of 1500 to 10,000 centipoises, when measured at 25° C. as a 50% solution, ultimately proved to be best for the control of smoothness. The PVM (poly vinyl methyl ether) appears to act as a tackifying agent and to control the flow of the film before hardening, as well as to provide improved characteristics in the completed film. It also produces wetting of metal surfaces by the film, and retains this wetting adherence during drying and the cross polymerization which later occurs.

The use of methylon 108 (R 108) or its equivalent has proved essential to the production of the coating. This product, sold under this name or under the name "G-E 75108" is the allyl ether of methylol phenol as disclosed in Example VI of Patent 2,579,330. This material has a specification as follows:

| | |
|---|---|
| Percent reactive, weight, av. | 99. |
| Solvent | None. |
| Viscosity at 25° C. (77° F.) in centipoises | 2000–4000. |
| Color | Clear dark brown. |
| Pounds per gallon, av. | 10. |
| Flash point, closed cup, ° F. | Over 85. |
| Free water content, percent | 0–2. |

G-E 75121 contains the same allyl ether of methylol phenol in solvents and may be used in place of the 75108 where the signal-noise ratio is not of critical importance. The specifications for this product are as follows:

| | |
|---|---|
| Percent solids, weight | 59–61. |
| Solvent: xylene/octyl alcohols | 2:1. |
| Viscosity (Gardner-Holdt) | J-L. |
| Color | Clear amber. |
| Pounds per gallon | 8.6. |
| Flash point | Over 85° F. |

In general, butyrolactone has improved the product, but if used to excess will cause craters in the film. It is normally employed in the range of 1 to 100 grams per gallon of coating fluid.

The amount of PVM depends somewhat inversely upon the amount of butyrolactone. The lactone, during baking, breaks down to form succinic anhydride and possibly another anhydride, which are catalysts. When PVM is used with toluene as a solvent, 20 grams per gallon is preferred. When isopropyl alcohol is employed as a solvent, 30 grams per gallon is preferred. However, when no butyrolactone, or very little butyrolactone is used, the amount of PVM may be increased to 53 grams per gallon.

The various solvents employed are replaceable. It has been found that ethyl amyl ketone is of particular value, however, in its versatility.

The use of an epoxy resin plus butyrolactone as a combined catalyst and viscosity modifier is believed to be unique in itself, independent of the other characteristics of the compositions.

The silicone resin SR–82 is a flow control agent, and has a particular value in the prevention of pinholes, particularly with highly pigmented material. With less highly pigmented material the need for SR–82 is reduced, and in some situations it may be eliminated. SR–82 silicone resin is one which air dries to a tack-free film. It is ordinarily supplied at 60% (±1) total solids xylene with a specific gravity of 1.05 to 1.07 at 25° C. The viscosity is 5 to 30 centipoises at 25° C. as measured by the Brookfield viscosimeter at a spindle speed of 60 r.p.m. It has a drying time of 30 minutes at 200° C.

This resin is a methylphenylpolysiloxane resin which is prepared by the general method described in Rochow Patent 2,258,222. In general, this procedure of preparation comprises the hydrolysis of a mixture of various methyl and phenyl substituted organochlorosilanes. SR–82 has an average of 0.6 methyl groups and 0.8 phenyl groups per silicon atom.

The properties of the preferred magnetic iron oxide are as follows:

| Property | Magnetizing Field Strength, Oersteds | Range, Gauss |
|---|---|---|
| Residual Saturation (Br) | 300 | 160–250 |
| Residual Saturation (Br) | 1,000 | 1,750–2,100 |
| Maximum Saturation (Bm) | 1,000 | 3,000–3,700 |
| Coercive Force (Hc) | 1,000 | 275–325 |
| Physical: | | |
| Water Soluble Salts | .30% max | |
| pH of oxide water suspension | 7.0–8.0 | |
| +325 oversize net screen test | .30% max | |
| Water content | 0.4% max | |
| Chemical: | | |
| Gamma $Fe_2O_3$ | 98.0% min | |
| ZnO | .5% max | |
| MnO | .30% max | |
| Alpha $Fe_2O_3$ | .20% max | |
| All others not to exceed | 1.0% max | |
| No cobalt or nickel traces are allowable. | | |

The poly vinyl methyl ether has a viscosity of 1500 to 10,000 centipoises at 77° F. in 50% toluene as determined by a Brookfield viscosimeter using a spindle speed of 10 r.p.m. The refractive index in 50% toluene solution ($N_d^{25}$) is 1.479–1.484. The specific gravity in that solution is 0.945–0.985. Maximum water content as determined by the Karl Fischer reaction shall be 0.2%.

Isophorone has a specific gravity of 0.915–0.923 at 25° C.; a distillation range of 202–220° C., and has the formula:

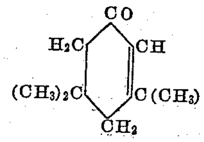

The refractive index is 1.472–1.482.

Epon 1004 is a condensation polymer of epichlorohydrin and bisphenol A. It is a yellow, flaky solid at room temperatures, melts at 95–105° C.; the epoxide equivalent is 870–1025. Maximum water content is .3%.

The hexa hydro phthalic anhydride (cis-1,2-cyclohexanedicarboxylic anhydride) is a glassy solid melting to a clear, colorless, viscous liquid. Solidification point is 35–36° C.

The butyrolactone has the formula:

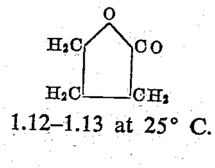

Specific gravity is 1.12–1.13 at 25° C. Boiling point is 203.5–204.5° C.

Figure 2:
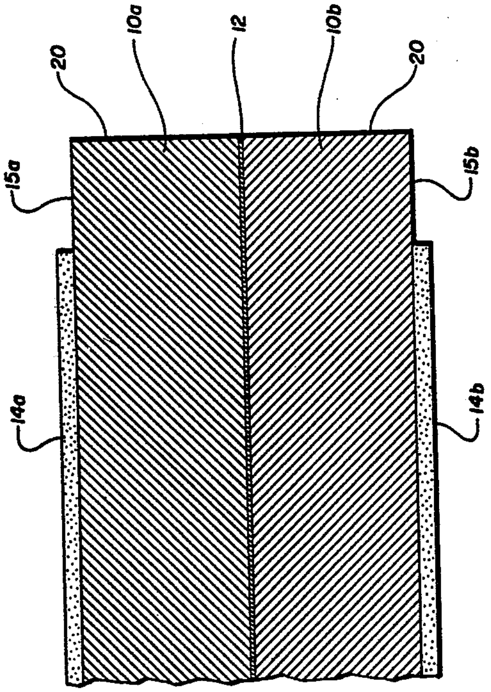

In the drawing:

FIG. 1 is a central section through an aluminum disc which is employed for magnetically storing information and which is provided with magnetizable coatings embodying our invention, and FIG. 2 is an enlarged detail view of part of the disc illustrated in FIG. 1, with the magnetic coating shown as of greatly exaggerated thickness for the sake of illustration.

We have found that a mixture comprising the epoxy resin, the phenolic intermediate and the poly-vinyl-methyl-ether, when properly thinned out by the addition of suitable solvents with or without diluents, produces a composition that may be readily applied in a thin continuous film to a metal surface and which, when cured by the application of elevated temperatures, forms a permanent, tough, weather- and solvent-resisting film that has a remarkable adherence to metal, especially aluminum, so much in fact than when an attempt is made to scrape the coating from the metal surface, it is difficult, if not impossible, to remove the coating without taking along parts of the metal. Moreover, a very high percentage of finely divided magnetizable material may be incorporated into the composition without impairment of the desirable qualities of the composition and of the resultant coating and without impairment of the magnetic properties of the magnetizable particles. We are aware that coating compositions may have been prepared in the past including any two of the three ingredients named above, but none of these compositions has all the desirable properties of the composition of the present invention; none produces a film or coating of such thinness and permanency as that of the present invention, and most of all, none of the coatings resulting from a mixture of any two of the named components develops an adherence to metal that is comparable with the adherence possessed by the coatings produced in accordance with the invention.

We are unable to explain with certainty the remarkable qualities of a coating produced from a composition including all three of the above named components, as compared with coatings resulting from the combination of only two of said components, but we believe that when the epoxy resin and the phenolic intermediate commence to polymerize and cross-link with each other during the curing process of the composition, the presence of the poly vinyl methyl ether which polymerizes at lower temperatures than either of the other two components, establishes conditions that cause the resultant polymerization structures to accept metal atoms from the metal surface, that are linked to the molecules that are formed by the interaction of the epoxy resin and the phenolic intermediate.

We have obtained excellent results when the composition of the invention contained the epoxy resin, the phenolic intermediate, and the poly vinyl methyl ether in the ratio of 56%:32%:12%. In such a composition, when appropriately thinned out by the use of suitable solvents with or without diluents, we have been able to introduce a very high percentage of finely divided magnetizable particles, such as 24.4% by weight, of particles of magnetic iron oxide of an average size of 1 to 2 microns. The described composition is stable for extended periods of time at room temperature and will not commence to polymerize until subjected to elevated temperatures. It has, therefore, a long "pot life" and the exact moment when it may commence its conversion into a solid coating, may readily be controlled. To accelerate this conversion and to carry it through to an extent where the resultant product is uniformly inert, we add a catalyst to the composition which is effective only at higher than room temperatures. We have found hexa hydro phthalic anhydride dissolved in butyrolactone and thinned out by the addition of xylol to be a highly effective catalyst in the spirit of our invention, although other catalysts, such as methyl nadic anhydride or tetra hydro phthalic anhydride have given satisfactory results. The use of butyrolactone as a solvent for the catalyst is particularly advantageous, because at the elevated temperatures to which the composition of the invention is subjected to effect its conversion into a hard and permanent coating, butyrolactone disassociates into a series of acid anhydrides which act as catalysts, in much the same manner as the hexa hydro phthalic anhydride and thus speed up the curing process of the composition and assure a high degree of completion of said process at a saving in cost.

In carrying out an exemplary embodiment of our invention for the purpose of producing a magnetic coating upon discs or drums intended for magnetically storing information, we prepare first a mixture of an epoxy resin known as Epon 1004 and of a natural magnetic iron oxide ($Fe_3O_4$) in a ratio of about 1:2, and preferably 35:65, and we add to said mixture approximately an equal amount in weight of a suitable solvent. We prefer to use high boiling solvents, to which a diluent may be added for reasons of economy and as an aid in keeping the particles of iron oxide properly dispersed in the resultant mixture. In the preferred embodiment of the invention which we are about to describe, we use a mixture of equal parts by volume of the solvents isophorone and ethyl amyl ketone and of the diluent xylol. Equal parts, by weight, of the epoxy resin/iron oxide mixture and of the solvent/diluent mixture are placed into a ball mill using steel balls approximately ½ inch in diameter, wherein they are milled continuously for about two weeks to reduce the iron oxide to a fineness of about 1 to 2 microns and to distribute these particles evenly throughout the mixture. To test the resultant mixture for completeness, a film of about 1 mm. thickness may be cast on a glass slide and allowed to dry. The film should appear smooth and dense, and the individual particles should not be visible to the naked eye.

We then prepare a mixture of the phenolic intermediate R 108 and of poly vinyl methyl ether dissolved in about 50% of its weight of toluene. In the exemplary embodiment of the invention which we are about to describe, the mixture consists of 56.67% by weight of the phenolic intermediate and 40.5% by weight of the poly vinyl methyl ether solution, and also of 2.83% by weight of silicone identified in trade by the letters SR-82. We prefer to add a small percentage of silicone to the composition of our invention because it acts as a flow control agent and aids in the elimination of air bubbles, when the composition is applied to the article to be coated. Also, it is itself a resin that cross-links readily with the other resins and therefore forms a well integrated part of the final coating structure.

We also prepare a catalyst mixture by dissolving hexa hydro phthalic anhydride in a solvent consisting of equal parts by volume of xylol and butyrolactone. In the exemplary embodiment of the invention here described, we dissolve 11.1% by weight of hexa hydro phthalic anhydride in 88.9% of a mixture of butyrolactone and xylol.

As the next step a desired quantity of the initially described epoxy resin/iron oxide mixture is weighed out in a suitable container, whereupon 16.45% by weight of the mixture containing the phenolic intermediate, poly vinyl methyl ether and silicone, and 6% by weight of the catalyst solution are added to the container and stirred into the epoxy/iron oxide mixture. The resultant composition is stirred continuously to prevent flocculation and setting of the iron oxide particles. A thinner consisting of equal parts of xylol and butyrolactone may be added, if required, to bring the composition to its best application viscosity.

In the particular embodiment of the invention which we describe herewith, the composition is applied to the surfaces of an annular aluminum disc 10, such as shown in FIG. 1, to provide magnetic coatings thereon which are to be employed to store information in business machines. The disc 10 illustrated in FIG. 1 is a laminated structure comprising actually an upper disc half and a lower disc half 10*a* and 10*b*, respectively, which are permanently held together by a suitable adhesive indicated at 12 (FIG. 2). The disc halves 10*a* and 10*b* are provided with magnetic coatings 14*a* and 14*b*, respectively, upon their outer surfaces 15*a* and 15*b* before they are joined together. To apply the composition of the invention to the outer surfaces of the disc halves, it is not necessary, aside from wiping the surfaces with a cloth dipped in perchlorethylene to pre-treat these surfaces in any particular form, such as has previously been necessary to establish a good bond between a coating and a metal. It is of advantage, however, first to filter the composition of the invention through a 200 mesh nylon screen so as to remove any particles which might cause lumps in the final coating. The composition is then applied in a thin film directly to the outer surfaces of the disc halves 10*a* and 10*b*. This is preferably accomplished by placing the disc halves on a turn table (not shown) and rotating them on said table at a speed of approximately 70 r.p.m., while pouring the composition slowly upon their top surface 15*a* and 15*b*, respectively, at a point near the edge 16 of their center hole 18, and directing the flow of the composition gradually toward their outer edge 20. We then increase the speed of rotation to about 125 r.p.m. and in this manner the composition of the invention will be spread evenly in a very thin film over the outer surfaces of the disc halves. The coated disc halves are then transferred into an oven, wherein they are subjected to a temperature of between 300° to 350° F. for about an hour. The result is an extremely thin, uniform and extremely tough film wherein the magnetic powder is evenly distributed. This film is shown as of greatly exaggerated thickness in both FIGS. 1 and 2 for reasons of illustration. In reality, it may be less than one-thousandth of an inch in thickness. A suitable adhesive is then applied to the uncoated or inner sides of the disc halves and one disc half is placed with its inner side upon the inner side of the other disc half, so as to produce the composite structure 10 shown in FIGS. 1 and 2.

The coating prepared in the manner described hereinbefore exhibits an adhesion to metal surfaces, and in particular to aluminum surfaces, that exceeds anything accomplished before. As previously pointed out, it is in fact difficult, if not impossible, to scrape the coating from the surface of the disc without taking part of the aluminum along. As also pointed out before, it is impossible to achieve this result with any two of the three main ingredients of our composition. We believe this result to be due to conditions set up by the presence of the poly vinyl methyl ether at the time the epoxy resin and the phenolic intermediate begin to polymerize and cross-link under the influence of the elevated temperatures to which the disc halves with the composition applied to their outer surfaces, are subjected. The poly vinyl methyl ether component commences polymerization at an appreciably lower temperature than the epoxy resin and the phenolic intermediate, i.e., at temperatures below 200° F. when neither of the other two components exhibits any particular film-forming characteristics. We believe that the presence of the poly vinyl methyl ether polymer in the composition prevents segregation and separate agglomeration of the other two components during their initial polymerization and cross-linking stage and holds them in closest contact with the metal surfaces so that they do not only cross-link with each, but also accept aluminum atoms in their final polymerization structure. We are forced to this conclusion by the fact that the coating of the invention will adhere as firmly to smooth metal surfaces as to rough or artificially roughened metal surfaces. The coating of the invention is hard, yet it is not brittle; it has a horn-like consistency. We believe that this is due to the presence, in the final product, of the polymerized poly vinyl methyl ether which acts as a plasticizer that prevents the coating from becoming excessively hard and brittle.

The composition of the invention is composed of relatively inexpensive and readily available components. In addition, since the invention makes it unnecessary to pre-treat the metal surfaces to which the composition is applied in a mechanical and/or chemical manner, it provides a very considerable saving in labor and in cost of materials. Moreover, the resultant coating is chemically inert, it remains unchanged under adverse atmospheric conditions, and is especially unaffected by humidity. It is also highly resistant to attack by chemicals. It is stable and will neither soften nor turn excessively hard and brittle in time. The coating of the invention is extremely smooth. It does not form minute peaks and hills that may be knocked off during use and cause "dusting."

*Ranges of Proportions Preferred*

| | Production Coating Using Preferred Magnetic Iron Oxide as Pigment, percent by wt. | | | Best Coating Using Natural Oxide, percent by wt. | | |
|---|---|---|---|---|---|---|
| | Standard | Minimum | Maximum | Standard | Minimum | Maximum |
| 1. Proportion Resin to Total Resin: | | | | | | |
| Epon 1004 | 57.5 | 40 | 65 | 55.5 | 38.5 | 60.5 |
| R 108 | 30.6 | 27 | 40 | 30.2 | 25.1 | 48.6 |
| PVM | 10.94 | 9.0 | 12 | 12.8 | 8.22 | 20.82 |
| SR 82 | 0.92 | .7 | 1 | 0.83 | 0.64 | 1.05 |
| 2. Solids to Total Solids: | | | | | | |
| Pigment | 51 | 45 | 55 | 65 | 50.5 | 75.9 |
| Epon 1004 | 27.5 | 24 | 30 | 19.5 | 16.4 | 27.4 |
| R 108 | 14.63 | 10 | 18 | 10.4 | 7.32 | 18.67 |
| PVM | 5.23 | 2.6 | 7.5 | 4.42 | 2.61 | 7.15 |
| SR 82 | 0.44 | .2 | .5 | 0.285 | 0.20 | 0.423 |
| Hexa Hydro Phthalic Anhydride | 1.21 | 1 | 2 | 0.742 | 0.522 | 1.34 |
| 3. Pigment Solid to Resin Solids | 104.5 | [1] 100 | [1] 108 | 188 | 102 | 314 |
| 4. Pigment Solid Plus Resin Solids to Solvent | [2] 50.3 | 40 | 55 | 59.3 | about 45 | 65 |
| 5. Catalyst to Epon (percent) | 3.86 | 3.86 | 65.3 | 3.86 | 3.86 | 65.3 |
| 6. Proportion (percent) Butyrolactone to Complete Mix | 2.7 | 2.7 | 13.5 | 0 | 0 | about 13 |

[1] For adequate magnetic coating.
[2] Not including but./xylol catalyst mixture.

While we have hereinbefore given preferred proportions for the components of our composition, and have stated a preferred temperature for converting said composition into a solid coating, it will be understood that both, the preferred proportions, and the preferred temperature, may be departed from to suit particular situations of environment and application, while still securing the unique results of the exemplary embodiment of the invention described above, and without departing from the scope and spirit of the present invention. Also, catalysts, solvents and diluents other than those specifically named will readily occur to those skilled in the art, and may be employed without departing from the scope of the invention.

Finally, while we have described the composition of our invention as employed to act as a carrier for magnetic particles and thus provide a magnetic coating, it will be understood that it may also be employed by itself or in combination with color pigments to serve at a protective paint or coating for metal furniture, automobiles, ships and the like, without departing from the scope and spirit of the invention.

We claim:

1. A heat-hardenable, liquid, film-forming composition that is stable at room temperatures and capable of being applied as a uniform coating hardening to a smooth, hard, tough, metal-adherent coating that is stable at high humidities and possesses good mechanical and solvent resistant properties, which consists essentially of an epoxide resin that is a glycidal polyether of a polyhydric phenol having an epoxide equivalent in excess of about 450, a methylol phenol ether which is cross-polymerizable with the epoxide resin, polyvinyl methyl ether, and a compatible acid anhydride catalyst that is stable at room temperature.

2. A heat-hardenable, liquid, film-forming composition that is stable at room temperatures and capable of being applied as a uniform coating and hardening to a smooth, hard, tough, metal-adherent coating that is stable at high humidities and possesses good mechanical and solvent resistant properties, which consists essentially of an epoxide resin that is a glycidal polyether of a polyhydric phenol having an epoxide equivalent in excess of about 450, a methylol phenol ether which is cross-polymerizable with the epoxide resin, polyvinyl methyl ether, a compatible acid anhydride catalyst that is stable at room temperature, and ferro-magnetic material to provide for signal recording and storage in the hardened coating.

3. A heat-hardenable, liquid, film-forming composition that is stable at room temperatures and capable of being applied as a uniform coating and hardening to a smooth, hard, tough, metal-adherent coating that is stable at high humidities and possesses good mechanical and solvent resistant properties, which comprises about 16.4–30 parts by weight of an epoxide resin that is a glycidal polyether of a polyhydric phenol having an epoxide equivalent of about 450–1650, about 7.32–18.67 parts by weight of an allyl ether of methylol phenol, about 2.6–7.5 parts by weight of polyvinyl methyl ether, all of said parts by weight being based upon solids, and a compatible acid anhydride catalyst that is stable at room temperature.

4. The composition of claim 3 wherein the epoxide equivalent is about 800–1650.

5. The composition of claim 3 wherein said catalyst is a member from the group consisting of hexahydrophthalic anhydride, methyl nadic anhydride and tetrahydrophthalic anhydride.

6. The composition of claim 3 wherein said catalyst includes hexahydrophthalic anhydride.

7. The composition of claim 3 wherein said catalyst includes hexahydrophthalic anhydride dissolved in butyrolactone.

8. A heat-hardenable, liquid, film-forming composition that is stable at room temperatures and capable of being applied as a uniform coating and hardening to a smooth, hard, tough, metal-adherent coating that is stable at high humidities and possesses good mechanical and solvent resistant properties, which comprises about 16.4–30 parts by weight of an epoxide resin that is a glycidal polyether of a polyhydric phenol having an epoxide equivalent of about 450–1650, about 7.32–18.67 parts by weight of an allyl ether of methylol phenol, about 2.6–7.5 parts by weight of polyvinyl methyl ether, all of said parts by weight being based upon solids, a compatible acid anhydride catalyst that is stable at room temperature, and ferro-magnetic material to provide for signal recording and storage in the hardened coating.

9. A heat-hardenable, liquid, film-forming composition that is stable at room temperatures and capable of being applied as a uniform coating and hardening to a smooth, hard, tough, metal-adherent coating that is stable at high humidities and possesses good mechanical and solvent resistant properties, which comprises about 16.4–30 parts by weight of an epoxide resin that is a glycidal polyether of a polyhydric phenol having an epoxide equivalent of about 450–1650, about 7.32–18.67 parts by weight of an allyl ether of methylol phenol, about 2.6–7.5 parts by weight of polyvinyl methyl ether, all of said parts by weight being based upon solids, a compatible acid anhydride catalyst that is stable at room temperature, and about 1–100 grams of butyrolactone per gallon of said liquid film-forming composition.

10. A heat-hardenable, liquid, film-forming composition that is stable at room temperatures and capable of being applied as a uniform coating and hardening to a smooth, hard, tough, metal-adherent coating that is stable at high humidities and possesses good mechanical and solvent resistant properties, which comprises about 16.4–30 parts by weight of an epoxide resin that is a glycidal polyether of a polyhydric phenol having an epoxide equivalent of about 450–1650, about 7.32–18.67 parts by weight of an allyl ether of methylol phenol, about 2.6–7.5 parts by weight of polyvinyl methyl ether, a compatible acid anhydride catalyst that is stable at room temperature, about 0.2–0.5 part by weight methylphenylpolysiloxane, and all of said parts by weight being based upon solids.

11. A heat-hardenable, liquid, film-forming composition that is stable at room temperatures and capable of being applied as a uniform coating and hardening to a smooth, hard, tough, metal-adherent coating that is stable at high humidities and possesses good mechanical and solvent resistant properties, which comprises about 56 parts by weight of an epoxide resin that is a glycidal polyether of a polyhydric phenol having an epoxide equivalent of about 450–1650, about 32 parts by weight of an allyl ether of methylol phenol, about 12 parts by weight of polyvinyl methyl ether, and a compatible acid anhydride catalyst that is stable at room temperature.

12. A metal article having a surface with a baked-on adherent coating, which consists essentially of a metal article having an adherent baked-on coating that is smooth, uniform, hard, tough, stable at high humidities and possesses good mechanical and solvent resistant properties, said baked-on coating being produced by baking on said article a heat-hardenable, film-forming composition containing an epoxide resin that is a glycidal polyether of a polyhydric phenol having an epoxide equivalent in excess of about 450, a methylol phenol ether which is cross-polymerizable with the epoxide resin, polyvinyl methyl ether, and a compatible acid anhydride catalyst that is stable at room temperature.

13. A magnetic signal storage device which comprises a non-magnetic metal base having an adherent baked-on coating that is smooth, uniform, hard, tough, stable at high humidities and possesses good mechanical and solvent resistant properties, said baked-on coating being produced by baking on said article a heat-hardenable, film-forming composition consisting essentially of an epoxide resin that is a glycidal polyether of a polyhydric phenol having an epoxide equivalent in excess of about 450, a methylol phenol ether which is cross-polymerizable with the epoxide resin, polyvinyl methyl ether, a compatible acid anhydride catalyst that is stable at room temperature, and ferro-magnetic material to provide for signal recording and storage.

14. An aluminum article having a surface with a baked-on adherent coating, which comprises an aluminum article having an adherent baked-on coating that is smooth, uniform, hard, tough, stable at high humidities and possesses good mechanical and solvent resistant properties, said baked-on coating being produced by baking on said article a heat-hardenable, film-forming composition containing about 2.6–7.5 parts by weight of an epoxide resin that is a glycidal polyether of a polyhydric phenol having an epoxide equivalent of about 450–1650, about 7.32–18.67 parts by weight of an allyl ether of methylol phenol, about 2.6–7.5 parts by weight of polyvinyl methyl ether, all of said parts by weight being based upon solids, and a compatible acid anhydride catalyst that is stable at room temperature.

15. A magnetic signal storage disc consisting essentially of an aluminum disc having an adherent baked-on coating that is smooth, uniform, hard, tough, stable at high humidities and possesses good mechanical and solvent resistant properties, said baked-on coating being produced by baking on said article a heat-hardenable, film-forming composition consisting essentially of an epoxide resin that is a glycidal polyether of a polyhydric phenol having an epoxide equivalent of about 450–1650, an allyl ether of methylol phenol, polyvinyl methyl ether, ferro-magnetic material to provide for signal recording and storage, and a compatible acid anhydride catalyst that is stable at room temperature.

References Cited in the file of this patent

UNITED STATES PATENTS

| | | |
|---|---|---|
| 2,683,131 | Cass | July 6, 1954 |
| 2,687,396 | McLean | Aug. 24, 1954 |

OTHER REFERENCES

Schildknecht, Vinyl and Related Polymers, Wiley and Sons, N.Y. (1952), pages 602–603.